United States Patent [19]

Takami

[11] 4,384,776

[45] May 24, 1983

[54] CHARGE DETECTION DISPLAY TYPE ELECTRONIC FLASH

[75] Inventor: Satoshi Takami, Niiza, Japan

[73] Assignee: Asahi Kogaku Kogyo Kabushiki Kaisha, Japan

[21] Appl. No.: 182,745

[22] Filed: Aug. 29, 1980

[30] Foreign Application Priority Data

Sep. 11, 1979 [JP] Japan .......................... 54-125407[U]

[51] Int. Cl.³ ............................................ G03B 15/03

[52] U.S. Cl. .................................. 354/127; 354/145; 362/10

[58] Field of Search ....................... 354/127, 128, 145; 362/5, 10

[56] References Cited

U.S. PATENT DOCUMENTS 4,196,458 4/1980 Kondo ................................ 354/128

4,196,988 4/1980 Kawasaki ............................ 354/145

*Primary Examiner*—Russell E. Adams

*Attorney, Agent, or Firm*—Sughrue, Mion, Zinn, Macpeak and Seas

[57] ABSTRACT

A charge detection display type electronic flash in which the fact that the main capacitor is charged is detected and the flash is prevented from operating until the main storage capacitor is fully charged and in which triggering of the flash tube is prevented once the power switch has been turned off. A neon lamp is coupled through a resistor between the output of a DC-DC converter and a parallel combination of an impedance element and a second capacitor. A diode is coupled across the neon lamp. The X contact of the camera is connected between a thyristor which operates the triggering circuit of the flash and the common connection point of the impedance element and the neon lamp. A camera control circuit may be coupled as well to this point.

3 Claims, 4 Drawing Figures

FIG. 1
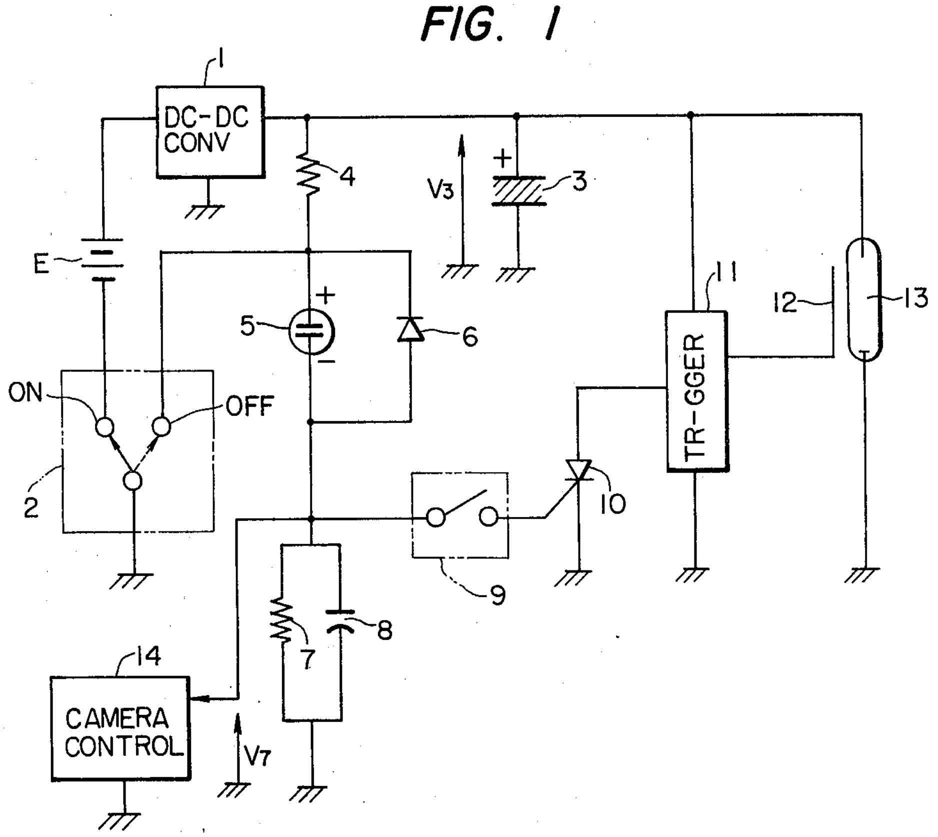
FIG. 2A
FIG. 2B
FIG. 2C
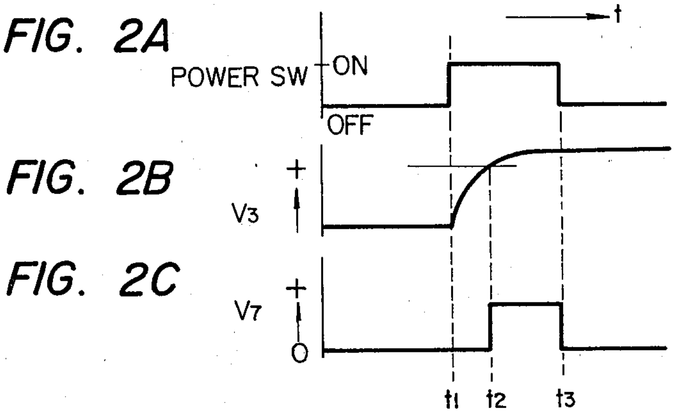

CHARGE DETECTION DISPLAY TYPE ELECTRONIC FLASH

BACKGROUND OF THE INVENTION

In a conventional electronic flash, the primary capacitor charge detection and display means is not associated in operation with the trigger circuit of the flash discharge tube. Therefore, the conventional electronic flash is disadvantageous in that if the trigger circuit is operated before an indication is given that the main charge storage capacitor is adequately charged, the intensity of light emitted is inadequate. That is, a voltage may be supplied to trigger the trigger circuit before the fact that the main capacitor has been charged is detected and displayed. It is impossible for a single circuit to provide a voltage level for controlling the operation of the trigger circuit at the time of display of the charge completion because of fluctuations in circuit element parameters.

An electronic flash may be not operated merely by opening the power switch to stop the operation of the DC-DC converter. That is, if the power switch is opened, the main capacitor is still maintained charged and the trigger circuit is also maintained energized. If, under this condition, the X contact is closed, the electronic flash will be actuated so that the flash can thus be operated unintentionally.

Accordingly, an object of the invention is to eliminate the above-described difficulties accompanying a conventional electronic flash. Another object of the invention is to provide a charge detection display type electronic flash in which the fact that the main capacitor is charged is detected to positively operate a camera control circuit.

SUMMARY OF THE INVENTION

In accordance with these and other objects of the invention, there is provided a charge detection display type electronic flash including a DC source, a DC-DC converter for providing a high voltage having an input coupled to receive power from the DC source, a flash tube, a trigger circuit for triggering the operation of a flash discharge tube, a main capacitor for storing energy to operate the flash discharge tube, a neon lamp coupled for detecting whether or not the main capacitor is charged, a diode the anode and cathode of which are connected to the positive and negative terminals of the neon tube, a parallel circuit including an impedance element such as a resistor and a capacitor connected between the negative terminal of the neon tube and ground, and a power switch having an armature contact selectively switchable between a first terminal which is connected to the DC source and a second terminal which is connected to a positive terminal of the neon lamp. With this construction, when the armature of the power switch is switched to the second terminal, the positive terminal of the neon lamp is grounded. The common connection point of the impedance element and the negative terminal of the neon lamp may be connected to a camera control circuit.

BRIEF DESCRIPTION OF THE DRAWINGS

FIG. 1 is a circuit diagram of a preferred embodiment of an electronic flash constructed according to the invention; and FIGS. 2A–2C taken together are a timing diagram showing variations with time of the charge voltage $V_3$ of a main capacitor 3 developed across an impedance element in response to the on-off operation of a power switch.

DESCRIPTION OF THE PREFERRED EMBODIMENTS

A preferred embodiment of an electronic flash constructed according to the present invention will be described with reference to the accompanying drawings.

In the accompanying drawings, FIG. 1 is a circuit diagram of an electronic flash of the invention and FIGS. 2A–2C taken together are a timing diagram showing voltages at various circuit points and the operation of a power switch in FIG. 1.

Referring to FIG. 1, a DC source E applies a high voltage to a main capacitor 3 through a DC-DC converter 1. A flash discharge tube 13 is connected in parallel with the main capacitor 3. The positive terminal of the capacitor 3 is connected through a resistor 4 to the positive terminal of a neon lamp 5 the negative terminal of which is grounded through a parallel circuit of an impedance element 7 and a capacitor 8. The positive and negative terminals of the neon lamp 5 are connected to the cathode and anode of a diode 6, respectively.

The connection point of the negative terminal of the neon lamp 5 and the impedance element 7 is connected through an X contact switch 9 to the gate electrode of a thyristor 10 which is connected so that a trigger circuit 11 is operated when the thyristor 10 is rendered conductive. The output of the trigger circuit 11 is connected to the trigger terminal 12 of the flash discharge tube 13. The connection point of the negative terminal of the neon lamp 5 and the impedance element 7 is further connected to a circuit 14 such as a camera control circuit.

The grounded armature of a power switch 2 may be switched between an ON terminal connected to the DC source E and an OFF terminal connected to the positive terminal of the neon lamp 5.

FIGS. 2A–2C show variations with time of the charge voltage $V_3$ of the main capacitor 3 (FIG. 2B) and a voltage $V_7$ developed across the impedance element 7 (FIG. 2C) in response to the on-off operation of the power switch (FIG. 2A).

The operation of the electronic flash thus constructed will be described with reference first to the case when the X contact switch 9 is open in the steady condition. When the armature of the power switch 2 is switched to the ON terminal, the voltage of the DC source E is applied to the DC-DC converter 1 and charging of the main capacitor 3 is started at the time instant $t_1$ in FIGS. 2A–2C. When the voltage of the main capacitor 3 reaches a certain value, current flows in the neon lamp 5 through the current limiting resistor 4 thereby turning on the neon lamp 5. Current flows also in the impedance element 7 developing a voltage across the impedance element 7 and also charging the capacitor 8. All that is required for the capacitance value of the capacitor 8 is that it be sufficient to store enough energy to trigger the thyristor 10. That is, the capacitance of the capacitor 8 can be relatively small. Therefore, the voltage $V_7$ in FIG. 2C can rise in a short time.

When the X contact switch 9 is closed upon depressing the camera shutter button, the voltage developed across the impedance element 7 operates the trigger circuit 11 as a result of which the gate electrode of the thyristor 10 is triggered so that the flash discharge tube 13 flashes or emits light at the time instant $t_2$.

It should be noted that the flash discharge tube is triggered only after the neon lamp 5 has been turned on which detects and displays whether or not the main capacitor 3 has been sufficiently charged.

If the electronic flash is to be prevented from being operated, the armature of the power switch 2 is switched over to the OFF terminal. As a result, the energy stored to trigger the thyristor 10 is immediately discharged through the diode 6 while the neon lamp 5 is turned off. The stored energy is shown in the form of voltage in FIG. 2C. Accordingly, even if the X contact switch 9 is closed, the trigger circuit 11 will not be operated and accordingly the electronic flash will not flash.

The voltage $V_7$ is developed across the impedance element 7 only after the main capacitor 3 has been charged to a predetermined voltage. Therefore, it means for detecting the voltage $V_7$ in the circuit 14 such as a camera control circuit is provided, then a control circuit system operating in association with the completion of the charging of the main capacitor can be provided. For instance, a system can be constructed in which the shutter speed of the camera is set to a flash synchronous shutter speed in response to the voltage $V_7$ in the camera control circuit. Alternatively, a display element such as a light emitting diode (LED) can be provided in the viewfinder of the camera to indicate that the main capacitor 3 of the electronic flash has been charged. The LED can be turned off utilizing the voltage $V_7$.

When the armature of the power switch 2 is switched to the OFF terminal, no voltage $V_7$ is developed. At that time, the operation of the camera control circuit is uneffected by the electronic flash circuit. That is, the circuit 14 such as a camera control circuit can be operated irrespective of the electronic flash.

As is clear from the above description, according to the invention, the desired operations can be positively achieved merely by operating the power switch as desired. The electronic flash according to the invention is simple and positive in operation and is free from erroneous flash operation. Furthermore, the electronic flash and its associated circuit such as a camera control circuit can be operated selectively in combination or individually merely by operating the power switch. Thus, the electronic flash according to the invention has a wide range of applications.

What is claimed is:

1. A charge detection display type electronic flash comprising: a DC source; a DC-DC converter for providing a high voltage having an input coupled to receive power from said DC source; a flash discharge tube; a trigger circuit for triggering the operation of said flash discharge tube; a main capacitor for storing energy to operate said flash discharged tube; a neon lamp coupled for detecting whether said main capacitor is charged; a diode, the anode and cathode of which are connected to the positive and negative terminals of said neon tube, respectively; a parallel circuit of an impedance element and a capacitor connected between the negative terminal of said neon tube and ground; and a power switch having an armature selectively switchable between a first terminal connected to said DC source and a second terminal connected to a positive terminal of said neon lamp, whereby, when said armature of said power switch is switched to said second terminal, the positive terminal of said neon lamp is grounded.

2. The electronic flash as claimed in claim 1 in which the connection point of said impedance element and the negative terminal of said neon lamp is connected to a camera control circuit.

3. A charge detection display type electronic flash comprising:

- a power switch having an armature contact coupled to a ground connection and having first and second terminals;
- a DC-DC converter;
- means for coupling a DC power source between said first terminal of said power switch and a power input terminal of said DC-DC converter;
- a main storage capacitor coupled between an output terminal of said DC-DC converter and said ground connection;
- a first resistor having a first terminal coupled to said output terminal of said DC-DC converter;
- a neon lamp having a first terminal coupled to a second terminal of said first resistor, said second terminal of said power switch being coupled to said second terminal of said first resistor;
- a diode coupled between first and second terminals of said neon lamp;
- a second resistor and a second capacitor coupled in parallel with said second resistor, said second resistor and said second capacitor being coupled between said second terminal of said neon lamp and said ground connection;
- a thyristor having a control input terminal coupled through an X contact switch to said second terminal of said neon lamp;
- a trigger circuit, said trigger circuit being coupled to operate in response to conduction of said thyristor; and
- a flash discharge tube coupled to receive power from said main storage capacitor and being coupled to be triggered by said trigger circuit.

* * * * *